Patented Nov. 21, 1939

2,180,762

UNITED STATES PATENT OFFICE 2,180,762

PROCESS FOR THE MANUFACTURE OF CARBONYL COMPOUNDS OF THE CYCLOPENTANOPOLYHYDROPHENANTHRENE SERIES

Karl Miescher, Riehen, and Hans Kaegi and Placidus Plattner, Basel, Switzerland, assignors to the firm of Society of Chemical Industry in Basle, Basel, Switzerland No Drawing. Application October 14, 1938, Serial No. 235,100. In Switzerland October 25, 1937

6 Claims. (Cl. 260—397)

According to this invention carbonyl compounds of the saturated and unsaturated cyclopentanopolyhydrophenanthrene series are made by subjecting to a thermal decomposition a triarylmethyl ether of the corresponding carbinol compound.

According to the present process the parent material is heated to a high temperature, for example to about 200–350° C., particularly under reduced pressure, or under pressure, if required in the presence of an inert gas, such as nitrogen or carbon dioxide. The reaction may also be conducted in the presence of a solid or liquid diluent. In this case it is advantageous to use a diluent which promotes catalytically the thermal decomposition, that is to say reduces the temperature required for the decomposition. There may be named, for example metals, metal oxides and metal salts, for example aluminum oxide, zinc oxide, copper powder and barium chloride. As liquid diluents there come into consideration, for example, hydrocarbons of high boiling point.

The reaction may be illustrated by the following general scheme:

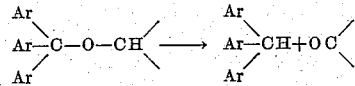

from which it will be seen that besides the desired carbonyl compound a triarylmethane is formed.

For isolating the carbonyl compounds produced in accordance with the invention there may be used methods of separation in themselves known, for example fractional distillation, sublimation or crystallization, reaction with ketone reagents or other purification or separation methods suitably adapted to the particular case in question. If the thermal decomposition is conducted under reduced pressure it is frequently possible to separate one of the products of the decomposition by distillation pari passu with its formation.

As parent materials there are used triarylmethyl ethers of carbinols of the cyclopentanopolyhydrophenanthrene series, for example of androstane-diols, androstane-triols, androstene-diols, androsterone, dehydroandrosterone, pregnane-diols, pregnene-diols, pregnanolones, pregnenolones, compounds of the suprarenal cortical hormone series, such as pregnene-3,21-diol-20-one, pregnene-3,17,20,21-tetrol, pregnene-3,20,21-triol, polyhydro-follicle hormones such as the octa-hydrofollicle hormone, as well as partially substituted derivatives of poly-ols, for example esters or ethers. The triarylmethyl ethers used as parent materials may contain, for example, the following triarylmethyl residues: triphenylmethyl, tritolylmethyl, tri-(biphenyl)-methyl-, trinaphthylmethyl-, mixed substituted triarylmethyl residues and the like.

According to the present process ketones or also aldehydes of the cyclopentanopolyhydrophenanthrene series are obtained. In contradistinction to known processes for the manufacture of such products, the present process has the advantage of being particularly simple while producing good yields. Testosterone may thus be produced directly from the easily obtainable androstene-diol-3-triphenylmethylether. According to this process it is also possible to convert primary hydroxyl groups into aldehyde groups without simultaneous oxidation of any secondary hydroxyl groups present, as the starting materials can be easily converted into their partial triarylmethyl derivatives.

The following examples illustrate the invention, the parts being by weight:

Example 1

A mixture of 10 parts of trans-dehydroandrosterone-triphenylmethyl ether (melting point 190° C.; prepared for example from trans-dehydroandrosterone and triphenylchloromethane in the presence of pyridine) and 5 parts of aluminium oxide is heated in a current of nitrogen to 350° C. When decomposition has occurred the reaction product is extracted with boiling ether, the ethereal solution is evaporated and the residue is digested with a strong mineral acid, such as hydrochloric acid. The androstene-dione which has been formed in the reaction is thereby dissolved. After separating undissolved matter the androstene-dione is precipitated by the addition of water and purified in known manner.

Example 2

15 parts of androstene-diol-3-triphenylmethyl ether (melting point 228° C.; obtained by reduction of the trans-dehydroandrosterone-triphenylmethyl ether referred to in Example 1) are slowly distilled in a vacuum at a pressure of about 15 mm. at about 200–300° C. The distillate is then separated, for example by fractional crystallization or also by treatment with the Girard reagent, into triphenylmethane and testosterone.

As starting material there may also advantageously be used for example androstene-diol-3-trinaphthylmethylether.

In a similar manner from an androstene-diol-3-tri-(biphenyl)-methyl ether-17-ester, for example, there is obtained the corresponding testosterone ester, for example testosterone propionate, which can be separated from the tri-(biphenyl)-methane formed by distillation under reduced pressure.

In a corresponding manner pregnene-dione can be obtained from a triarylmethyl ether of pregnene-3-ol-20-one and from the bis-triarylmethyl ethers of pregnane-diols there can be obtained the corresponding pregnane-diones.

In analogous manner there may for example also be obtained the following compounds:—
pregnene-3,21-diol-20-one, pregnene-3,17,21-triol-20-one, pregnene-17,21-diol-3,20-d i o n e, pregnene-3,20-dione-21-ol, pregnene-3,20-dione-17,21-diol.

What we claim is:

1. Process for the manufacture of carbonyl compounds of the cyclopentanopolyhydrophenanthrene series, comprising subjecting to a thermal decomposition triarylmethyl ethers of carbinol compounds of the cyclopentanopolyhydrophenanthrene series.

2. Process for the manufacture of carbonyl compounds of the cyclopentanopolyhydrophenanthrene series, comprising subjecting to a thermal decomposition triarylmethyl ethers of polyols of the cyclopentanopolyhydrophenanthrene series.

3. Process for the manufacture of carbonyl compounds of the cyclopentanopolyhydrophenanthrene series, comprising subjecting to a thermal decomposition triarylmethyl ethers of diols of the cyclopentanopolyhydrophenanthrene series.

4. Process for the manufacture of testosterone, comprising subjecting to a thermal decomposition 3-triarylmethylethers of androstene-diol.

5. Process for the manufacture of carbonyl compounds of the cyclopentanopolyhydrophenanthrene series, comprising subjecting to a thermal decomposition triarylmethyl ethers of oxyketones of the cyclopentanopolyhydrophenanthrene series.

6. Process for the manufacture of carbonyl compounds of the pregnene series, comprising subjecting to a thermal decomposition triarylmethyl ethers of carbinol compounds of the pregnene series.

KARL MIESCHER.
HANS KAEGI.
PLACIDUS PLATTNER.